No. 623,553. Patented Apr. 25, 1899.
C. J. MULDOON.
NUT LOCK.
(Application filed Mar. 25, 1898.)
(No Model.)
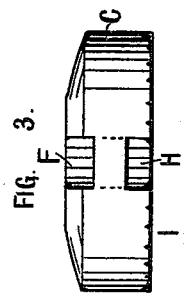
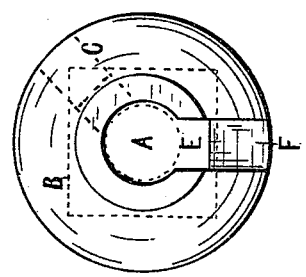
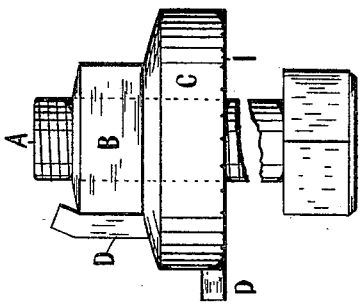
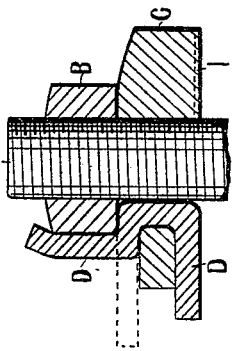
Witnesses:
H. C. H. Cooper.
C. G. Crannell
Inventor:
Charles J. Muldoon,
By Geo. B. Selden,
atty.

UNITED STATES PATENT OFFICE.

CHARLES J. MULDOON, OF ROCHESTER, NEW YORK, ASSIGNOR OF ONE-HALF TO JOHN A. STAPLETON, OF SAME PLACE.

NUT-LOCK.

SPECIFICATION forming part of Letters Patent No. 623,553, dated April 25, 1899.

Application filed March 25, 1898. Serial No. 675,087. (No model.)

*To all whom it may concern:*

Be it known that I, CHARLES J. MULDOON, a citizen of the United States, residing at Rochester, in the county of Monroe, in the State of New York, have invented an Improved Nut-Lock, of which the following is a specification, reference being had to the accompanying drawings.

My invention relates to an improved nut-lock, which is fully described and illustrated in the following specification and the accompanying drawings, the novel features thereof being specified in the claim annexed to the said specification.

In the accompanying drawings, representing my improved nut-lock, Figure 1 is a side elevation. Fig. 2 is a central longitudinal section. Fig. 3 is a side view of the washer. Fig. 4 is a plan view of the same.

A is the bolt, B the nut, and C the washer. The washer is roughened or corrugated on its inner surface, as indicated at I, to prevent its rotating, or in special situations it may be fitted into a recess in one of the parts to be clamped together, or for wood it may be provided with projecting lugs. The washer is provided with a recess E, Fig. 4, extending outward from the perforation through which the bolt passes, and on its inner and outer surfaces are the radial slots F and H, corresponding with the recess E. A strip of malleable metal D, of U shape, is inserted in the recess and the slots, as indicated by the dotted lines in Fig. 2, and after the nut is screwed home the strip is bent up against the side of the nut, as shown by the full lines in Figs. 1 and 2, to secure the nut in place and prevent its becoming loose. To unscrew the nut, it is only necessary to bend the strip D out again. The strip D is easily replaced in case it is broken or injured. In a modification a hole through the washer may be used instead of the recess E.

My invention is applicable to all kinds of structures in which bolts, studs, and nuts are used. It is cheap and effective, and the metallic strip or bar may be many times renewed at a nominal cost.

The lower bend of the bar D, entered in a slot in the washer, obstructs its removal and adds to its strength. It also serves to hold the bar and washer in suitable relation before they are applied to the bolt, and the two limbs of said bar are made long as compared with the diameter of the central opening in the washer for this purpose. The end of the upper limb of bar D is also of sufficient length to be bent back over the nut, as shown. With this construction the bar, being applied to the washer, as indicated by dotted lines in Fig. 2, will not be disengaged by ordinary handling and transportation, because of the length of the bar members, and when the washer and bar are finally combined with a bolt and nut the upper bar member can be bent inwardly over the nut to hold it securely.

A pin or nail may be used, passing through a hole in the washer, to prevent its turning. The washer may be provided with two or more slots arranged at suitable angles with each other, as indicated by the dotted lines in Fig. 4. The strip may be inserted in any one of these slots, so that when the nut is fairly screwed home it is not necessary to strain the bolt by turning it farther.

I claim—

The combination with the threaded bolt, of the nut, the washer having radial slots on its outer and inner faces and the recess in the central opening connecting the inner ends of the slots, and the bent bar having two members each fitted within a slot, said bar also fitting the recess and turned up along one side of the nut, the said members being adapted to prevent separation from the washer before its application to the bolt.

CHAS. J. MULDOON.

Witnesses:
GEO. B. SELDEN,
C. G. CRANNELL.